US008941717B2

(12) United States Patent
Baker et al.

(10) Patent No.: US 8,941,717 B2
(45) Date of Patent: Jan. 27, 2015

(54) SEMI-AUTOMATIC 3D STEREOSCOPIC DISPARITY CURSOR

(75) Inventors: Daniel G. Baker, Beaverton, OR (US); Lakshmanan Gopishankar, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 534 days.

(21) Appl. No.: 13/216,084

(22) Filed: Aug. 23, 2011

(65) Prior Publication Data

US 2012/0257010 A1 Oct. 11, 2012

Related U.S. Application Data

(60) Provisional application No. 61/473,369, filed on Apr. 8, 2011.

(51) Int. Cl.
*H04N 13/00* (2006.01)
*H04N 13/02* (2006.01)

(52) U.S. Cl.
CPC ........ *H04N 13/0022* (2013.01); *H04N 13/0271* (2013.01); *H04N 2013/0081* (2013.01)
USPC .............................. 348/42; 345/157; 345/178

(58) Field of Classification Search
CPC combination set(s) only.
See application file for complete search history.

(56) References Cited

U.S. PATENT DOCUMENTS

| | | | |
|---|---|---|---|
| 4,808,979 A | 2/1989 | Dehoff | |
| 7,564,626 B2 * | 7/2009 | Bendall et al. | 359/462 |
| 8,587,518 B2 * | 11/2013 | Davies | 345/157 |
| 2002/0141635 A1 * | 10/2002 | Swift et al. | 382/154 |
| 2010/0142801 A1 * | 6/2010 | Koppal et al. | 382/154 |
| 2010/0328427 A1 * | 12/2010 | Sakano et al. | 348/43 |
| 2011/0228051 A1 * | 9/2011 | Dedeoglu et al. | 348/46 |
| 2012/0140038 A1 * | 6/2012 | Bi et al. | 348/46 |

FOREIGN PATENT DOCUMENTS

WO 2011001856 A1 1/2011

OTHER PUBLICATIONS

Shan, J. Fu, C-S, Li, B. , Bethel, J., Kretsch, J., Mikhail, E. "Autostereopscopic Measurement: Principles and Implementation" ASPRS Annual Conference, May 23-28, 2004.*
"Advanced 3G/HD/SD-SDI Waveform Monitors: WFM8300, WFM8200 Data Sheet" from the website: http://cvp.com/pdf/wfm8000_datasheet.pdf.*
Hoff W et al., "Surfaces from Stereo: Integrating Feature Matching, Disparity Estimation, and Contour Detection," IEEE Transactions on Pattern Analysis and Machine Intelligence, IEEE Service Center, Los Almitos, CA, vol. 11, No. 2, Feb. 1, 1989 pp. 121-136.
EP Search Report from European Patent Application No. 12163394. 5, dated Aug. 14, 2012, 2 pages.

\* cited by examiner

*Primary Examiner* — Dave Czekaj
*Assistant Examiner* — Tyler W Sullivan
(74) *Attorney, Agent, or Firm* — Michael A. Nelson; Marger Johnson & McCollom PC

(57) ABSTRACT

Embodiments of the present invention provide a "disparity cursor" for easily measuring disparity within a selected region of a 3D image under test. In operation, a user places a window that defines the disparity cursor over a selected region of the 3D image under test using a mouse, keyboard, or other user-interface device. An average disparity value for the image segments contained within the window is then automatically calculated and reported to the user.

18 Claims, 3 Drawing Sheets

SEMI-AUTOMATIC 3D STEREOSCOPIC DISPARITY CURSOR

CROSS-REFERENCE TO RELATED APPLICATIONS

This application claims the benefit of U.S. Provisional Patent Application No. 61/473,396 titled "SEMI-AUTOMATIC 3D STEREOSCOPIC DISPARITY CURSOR" filed on Apr. 8, 2011 which is herein incorporated by reference.

FIELD OF THE INVENTION

The present invention relates to video test and measurement instruments, and more particularly to disparity measurements for three-dimensional (3D) images.

BACKGROUND OF THE INVENTION

Prior art stereoscopic 3D measurement methods determine the horizontal shift, also referred to as "disparity" or "pixel shift," between corresponding image segments of Left (L) and Right (R) eye images using one or more of the following methods:

1) Finding the corresponding image component that is in both the L and R image and measuring the difference in pixels in the horizontal position from either edge of the image. The resulting difference is the pixel disparity.

2) Using a first horizontally adjustable vertical line to mark an image segment on one image (L or R) and then using a second horizontally adjustable vertical line to mark the corresponding image segment in the other image. A readout then indicates the difference in the horizontal offset of each vertical line as the disparity.

The use of these methods can be augmented by one or more of the following methods to combine the L and R images into a single image to allow the disparity to be measured as in the methods above but using only a single image:

1) Subtracting the two images (L-R or R-L) to create a difference image where the disparity and edge intensity create a non-zero difference to more easily identify the image segments for disparity measurement.

2) Summing the images (either as-is, or with edge enhancement or detection) to create a double image to more easily identify the image segments for disparity measurement.

3) False coloring the L and R images as in anaglyph 3D to create a super-imposed image of L and R where the color fringe more easily identifies the image segment offset due to disparity.

SUMMARY OF THE INVENTION

Embodiments of the present invention provide a "disparity cursor" for easily measuring disparity within a selected region of a 3D image under test. In operation, a user places a window that defines the disparity cursor over a selected region of the 3D image under test using a mouse, keyboard, or other user-interface device. An average disparity value for the image segments contained within the window is then automatically calculated and reported to the user.

The objects, advantages, and other novel features of the present invention are apparent from the following detailed description when read in conjunction with the appended claims and attached drawings.

DETAILED DESCRIPTION OF THE INVENTION

Figure 1:
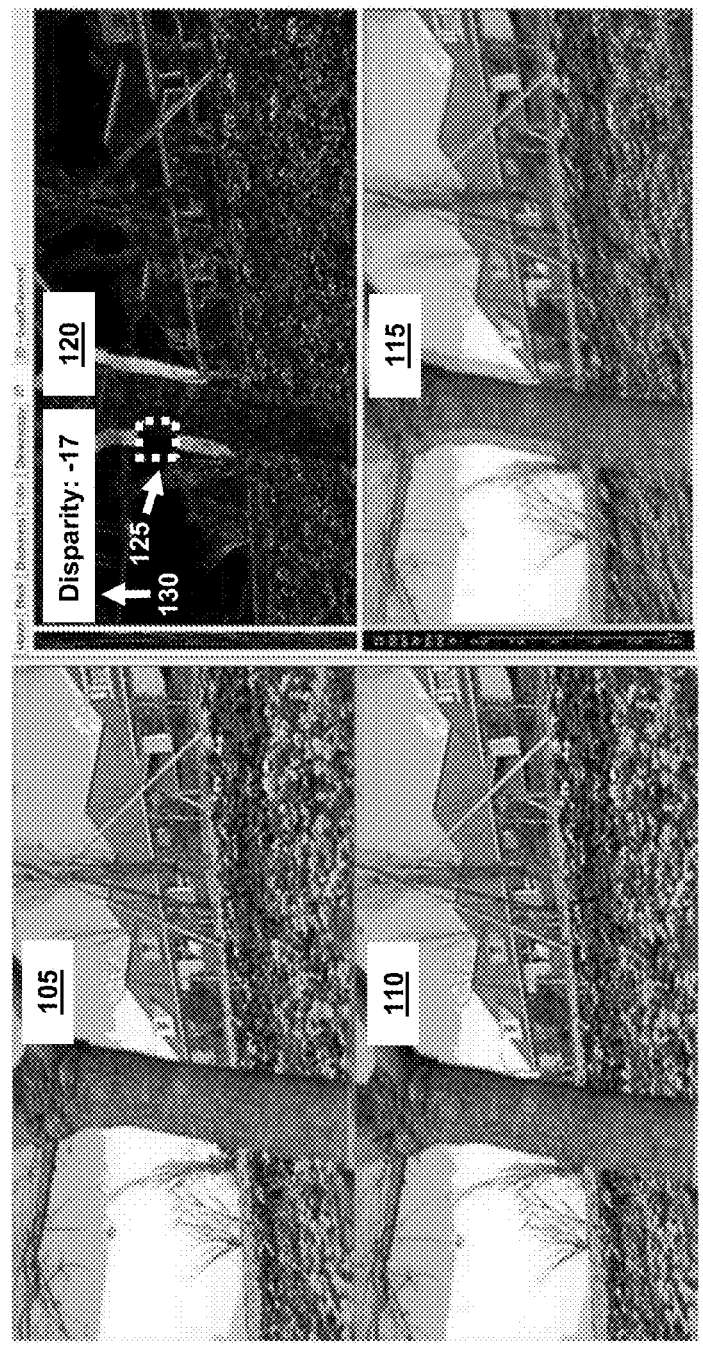
FIG. 1 depicts a first view of a display of a video test and measurement instrument having a disparity cursor according to an embodiment of the present invention.

Embodiments of the present invention provide a "disparity cursor" for easily measuring disparity within a selected region of a 3D image under test. In operation, a user places a window that defines the disparity cursor over a selected region of the 3D image under test using a mouse, keyboard, or other user-interface device. An average disparity value for the image segments contained within the window is then automatically calculated and reported to the user. The average disparity may be reported in various ways, for example, by displaying it in a numerical readout, by changing the appearance of the disparity cursor (described in more detail below), and so on. The average disparity may be reported in pixels or other units. This then effects a semi-automated measurement of the localized disparity whereby the user visually selects the image segment or components of a stereoscopic image pair to be measured.

In some embodiments, the appearance of the disparity cursor is changed to provide a visual indication of the average disparity within the window. For example, the window may be filled with a color indicative of the average disparity value.

In some embodiments, the appearance of the disparity cursor is changed to provide a visual indication of the quality of the estimate of the average disparity value. For example, the window may be filled with an image that represents the absolute value of the difference of the shifted L and R images, thereby providing an indication of the good-ness of the estimate of the optimum shift (described in more detail below).

In some embodiments, a disparity cursor is overlaid on a single image which is the combination of L and R where that single image is created by, for example, one of the methods discussed above. In other embodiments, two identical disparity cursors are used, one on the L image and one on the R image, to co-locate the desired image segment where the disparity is to be measured.

The average disparity may be calculated in various ways. In some embodiments, the average disparity value is determined by shifting a left image and a right image defined by the disparity cursor relative to one another until a difference between the two images is minimized. An example of such a search algorithm follows:

1) Two arrays of pixels, one from the L image luminance (Ly) and the other from the R image luminance (Ry), are created from those pixels contained within the window. The two arrays can be extracted from the Luma (Y) or R, G or B components if desired. Each time the window is moved, the arrays Ly and Ry are updated.

2) One of the arrays is shifted horizontally (or alternatively vertically for vertical disparity) whilst computing the absolute value of the difference between each pixel for a given shift value and then accumulating the difference of all the pixels in the window into a single value corresponding to that shift. This can be done by shifting Ly across Ry or vice-versa or both. Alternatively, rather than accumulating the absolute value of the pixel difference, the accumulated or mean of the square of the pixel differences or some other method to find the optimal estimate of the shift value could be done. This is done for all the horizontal shift values within the disparity search range.

3) The offset used that creates the minimum accumulated absolute value of the difference then indicates the best match for the disparity of the pixels contained within the window.

It is preferable to perform two shifts, the same amount but in opposite directions, (i.e., Ly across Ry and then Ry across Ly) and then find the minimum of the product of the resulting accumulated absolute value of the differences as in step 2. The shift used that has the minimum product becomes the indicated disparity as in step 3 above.

It is also preferable to indicate within the window overlaying the image the resulting pixel differences from step 2 above for the indicated shift with a minimum accumulated value. This way the user has feedback as to the degree to which the value indicated in step 3 is useful.

The attached Appendix illustrates an implementation of the above methods using the Mathcad programming language.

FIG. 1 depicts a display 100 of a video test and measurement instrument having a disparity cursor according to an embodiment of the present invention. The display 100 is divided into four tiles, with the upper-left tile depicting a left image 105 of a 3D image under test, the lower-left tile depicting a right image 110 of the 3D image under test, the lower-right tile depicting an anaglyph 115 of the 3D image under test, and the upper-right tile depicting a luminance difference 120 of the 3D image under test. The upper-right tile also depicts a disparity cursor 125 located on the left edge of a tree, and a numerical readout 130.

In FIG. 1, the window bounded by the disparity cursor 125 straddles the left side of a tree trunk. The readout 130 indicates that a shift of −17 pixels of the left image over the right was needed to get the absolute value of the difference of the contents within the windows to a minimum. The area within the disparity cursor 125 is black, which indicates that the absolute value of the difference of the shifted L and R images is approximately zero, or in other words, that a good minimum was found.

Figure 2:
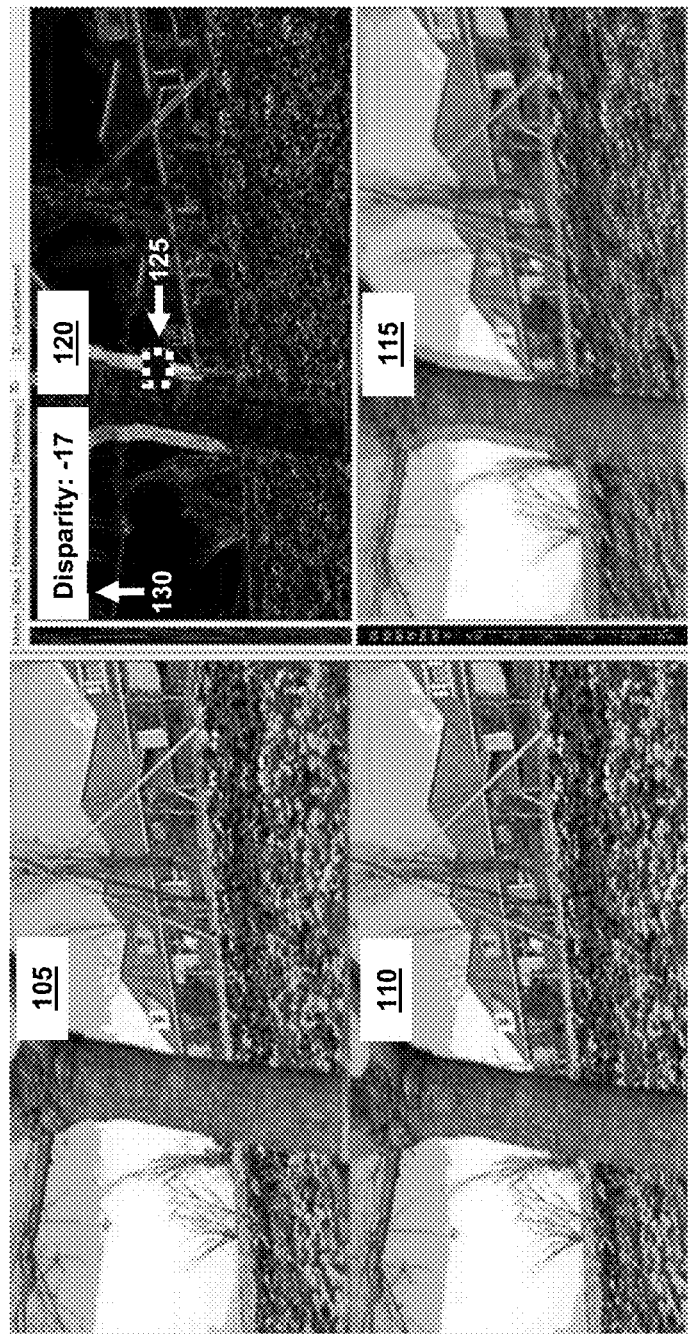
FIG. 2 depicts a second view of a display of a video test and measurement instrument having a disparity cursor according to an embodiment of the present invention.

In the display 200 depicted in FIG. 2, the disparity cursor 125 is moved to the right side of the tree trunk. Again, the readout 130 indicates a −17 pixel disparity, and the area within the disparity cursor 125 is black, which indicates that a good estimate of the optimum shift was achieved.

Figure 3:
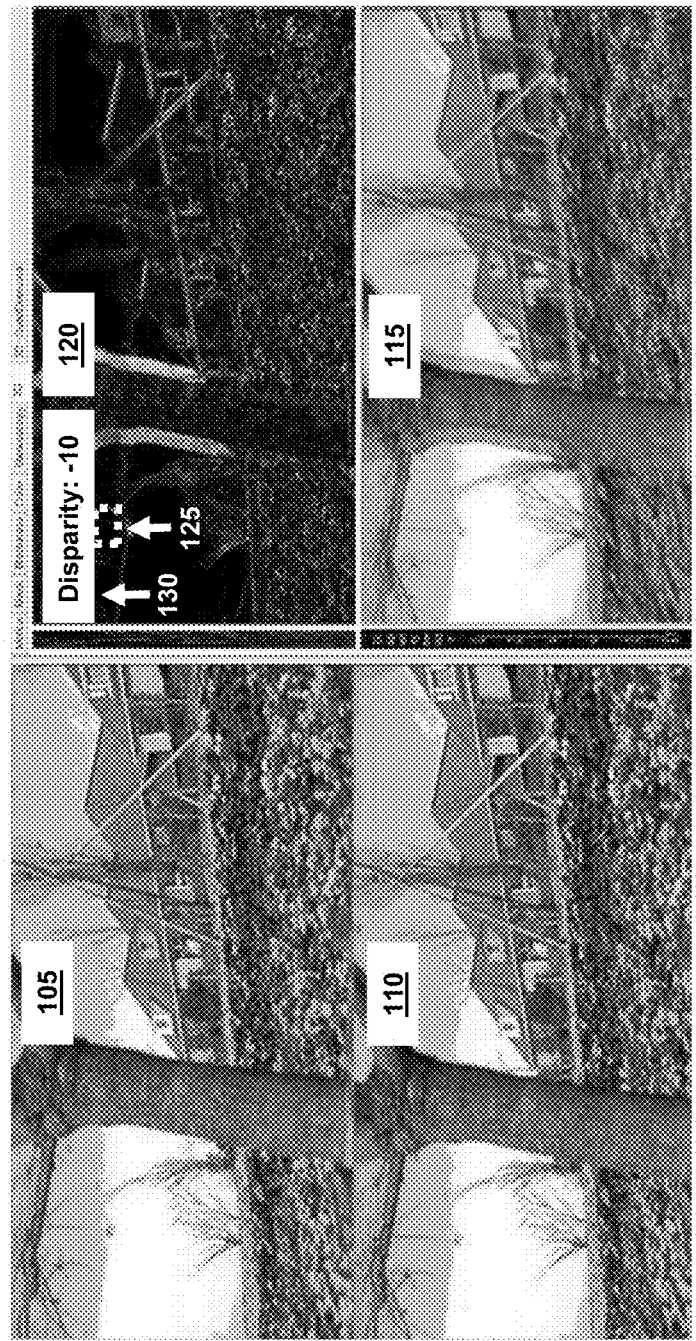
FIG. 3 depicts a third view of a display of a video test and measurement instrument having a disparity cursor according to an embodiment of the present invention.

In the display 300 depicted in FIG. 3, the disparity cursor 125 is moved to tree branches that are located farther away from the viewer than the trunk of the tree. Now, the readout 130 indicates a value of −10 pixel disparity. Again, the area within the disparity cursor 125 is black, which indicates that a good estimate of the optimum shift was achieved.

A numerical readout may be located in any portion of the display. In some embodiments, the readout is located near or within the disparity cursor, and the location of the readout tracks the movement of the disparity cursor.

A disparity cursor may be any shape. It may be rectangular (as shown in the Drawings), circular, an irregular shape, and so on.

In some embodiments, the user can adjust the size and/or shape of the disparity cursor, for example, by "dragging" the edges of the window.

In other embodiments, the size and/or shape of the disparity cursor is determined automatically for the user in order to provide an accurate disparity measurement. For example, the disparity search algorithm may adjust the size of the window in order to obtain a sharper minimum.

In some embodiments, the two (L and R) luminance images are edge filtered before extracting the Ly and Ry windows in order to help the disparity search algorithm find a sharper minimum. The edge filter may be any edge or gradient filter such as a Sobel filter, a Roberts filter, or the like.

A disparity cursor provides several advantages, such as:

1) In cases where the image under test contains many objects having differing disparity values, the shape and/or size of the window can be adjusted to focus on just the image segment to be measured.

2) In cases where the user is interested in the average disparity within only a particular segment of the image under test, the user can move the window to that segment.

3) In cases where the image under test contains areas where disparity measurements would be useless or ambiguous, the user can move the window to those portions of the image under test where disparity measurements provide meaningful results.

4) The user can see within the window to what degree the image difference for the indicated shift was achieved. For example, a completely black area within the window indicates that the indicated shift resulted in near complete subtraction of Ly and Ry components.

The disparity cursor described herein is useful in any disparity measurement application, for example, a computer running a software application such as the VQS1000 Video Quality Analysis Software available from Tektronix, Inc. of Beaverton, Oreg. The VQS1000 Video Quality Analysis Software is a useful tool for quality of experience (QoE) monitoring, network performance optimization, and remote in-service diagnostics of broadcast delivery issues.

It will be appreciated from the foregoing discussion that the present invention represents a significant advance in the field of video test and measurement instruments. Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A test and measurement instrument comprising:
a user interface including a disparity cursor for selecting a region of a three-dimensional image under test;
a processor for calculating a set of difference measurements associated with two or more shift values of a plurality of shift values for the selected region;
the processor further including a minimizer for determining a minimum of the set of difference measurements; and
the user interface further including a user display and having means for reporting a disparity value for the selected region to a user on the display, the disparity value related to the shift value associated with the determined minimum, in which the means for reporting the disparity value further includes means for changing the appearance of the disparity cursor on the display.

2. A test and measurement instrument as in claim 1 wherein the means for reporting the disparity value comprises a numerical readout on the display.

3. A test and measurement instrument as in claim 1 in which the means for changing the appearance of the disparity cursor is structured to provide a visual indication of the quality of the reported disparity value on the display.

4. A test and measurement instrument as in claim 1 wherein the disparity cursor is overlaid on a single image which is a combination of a left image and a right image.

5. A test and measurement instrument as in claim 1 wherein the disparity cursor comprises two disparity cursors, one of which is overlaid on a left image, and the other which is overlaid on a right image.

6. A test and measurement instrument as in claim 1 wherein the size and/or shape of the disparity cursor is specified by the user.

7. A test and measurement instrument as in claim 1 wherein the size and/or shape of the disparity cursor is determined for the user by the test and measurement instrument.

8. A test and measurement instrument as in claim 1 wherein the difference measurement associated with a shift value is determined by shifting a left image and a right image defined by the disparity cursor relative to one another by the associated shift value.

9. A test and measurement instrument as in claim 8 wherein the left image and the right image are edge filtered.

10. A method comprising the steps of:
selecting a region of a three-dimensional image under test with a disparity cursor;
producing a set of difference measurements associated with two or more shift values of a plurality of shift values for the selected region;
determining a minimum of the set of difference measurements;
reporting a disparity value for the selected region through a user interface to a user, the disparity value related to the shift value associated with the determined minimum; and
changing the appearance of the disparity cursor in the user interface based on the determined minimum.

11. A method as in claim 10 wherein the step of reporting the disparity value comprises the step of displaying the disparity value in a numerical readout.

12. A method as in claim 10 in which the step of changing the appearance of the disparity cursor comprises providing a visual indication of the quality of the reported disparity value.

13. A method as in claim 10 wherein the disparity cursor is overlaid on a single image which is a combination of a left image and a right image.

14. A method as in claim 10 wherein the disparity cursor comprises two disparity cursors, one of which is overlaid on a left image, and the other which is overlaid on a right image.

15. A method as in claim 10 wherein the size and/or shape of the disparity cursor is specified by the user.

16. A method as in claim 10 wherein the size and/or shape of the disparity cursor is determined for the user.

17. A method as in claim 10 wherein the difference measurement associated with a shift value is determined by shifting a left image and a right image defined by the disparity cursor relative to one another by the associated shift value.

18. A method as in claim 17 wherein the left image and the right image are edge filtered in order.

\* \* \* \* \*